US007470183B2

(12) United States Patent
Wishart

(10) Patent No.: US 7,470,183 B2
(45) Date of Patent: Dec. 30, 2008

(54) FINITE POOL GAMING METHOD AND APPARATUS

(75) Inventor: Michael Wishart, Reno, NV (US)

(73) Assignee: IGT, Reno, NV (US)

( * ) Notice: Subject to any disclaimer, the term of this patent is extended or adjusted under 35 U.S.C. 154(b) by 551 days.

(21) Appl. No.: 10/868,114

(22) Filed: Jun. 15, 2004

(65) Prior Publication Data

US 2005/0277458 A1 Dec. 15, 2005

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ...................... 463/16; 273/138.2; 273/269; 283/903; 434/128; 379/93.13

(58) Field of Classification Search ............ 463/12–13, 463/16–25, 40–43; 273/236–237, 269, 292–293; 379/93.13

See application file for complete search history.

(56) References Cited

U.S. PATENT DOCUMENTS

| | | |
|---|---|---|
| 4,339,798 A | 7/1982 | Hedges et al. |
| 4,448,419 A | 5/1984 | Telnaes |
| 4,467,424 A | 8/1984 | Hedges et al. |

(Continued)

FOREIGN PATENT DOCUMENTS

| | | | |
|---|---|---|---|
| WO | WO 00/64546 | | 11/2000 |
| WO | WO 01/51147 | A1 | 7/2001 |
| WO | WO 01/60472 | A1 | 8/2001 |

OTHER PUBLICATIONS

U.S. Appl. No. 09/706,293, filed Nov. 3, 2000, Millerschone.

Diamonopoly Advertisement by International Gamco, Inc., published 2002.

Electronic Pull Tabs Advertisement by 21st Century Gaming, published prior to 2002.

Lucky Times California Lottery Newsletter published 1996.

Instant Winner Advertisement by Williams/WMS Gaming, published prior to 2002.

Play it again Advertisement by International Gamco, Inc., published 2000.

(Continued)

*Primary Examiner*—Robert E Pezzuto
*Assistant Examiner*—Paul A. D'Agostino
(74) *Attorney, Agent, or Firm*—Bell, Boyd & Lloyd LLP

(57) ABSTRACT

In a gaming method, data indicative of a final outcome may be received, and an initial set of symbols indicative of the final outcome may be displayed if the data indicative of the final outcome indicates a winning outcome, the initial set of symbols including an initial winning subset of symbols and an initial non-winning subset of symbols. Player input data indicative of a subset of symbols in the initial set to be discarded may be received, and replacement symbols may be determined such that a final set of symbols is indicative of the final outcome if the subset of symbols to be discarded includes at least one symbol from the initial winning subset, wherein the final set of symbols includes the replacement symbols in place of the subset of symbols to be discarded. The final set of symbols may be displayed, and an award corresponding to the winning outcome may be provided.

34 Claims, 9 Drawing Sheets

U.S. PATENT DOCUMENTS 4,494,197 A 1/1985 Troy et al.
4,582,324 A 4/1986 Koza et al.
4,652,998 A 3/1987 Koza et al.
4,669,730 A 6/1987 Small
4,689,742 A 8/1987 Troy et al.
4,805,907 A 2/1989 Hagiwara
4,815,741 A 3/1989 Small
4,817,951 A 4/1989 Crouch et al.
4,842,278 A 6/1989 Markowicz
4,856,787 A 8/1989 Itkis
4,982,337 A 1/1991 Burr et al.
5,011,159 A 4/1991 Fortunato et al.
5,042,809 A 8/1991 Richardson
5,092,598 A 3/1992 Kamille
5,100,137 A 3/1992 Fulton
5,158,293 A 10/1992 Mullins
5,167,413 A 12/1992 Fulton
5,224,706 A 7/1993 Bridgeman et al.
5,242,163 A 9/1993 Fulton
5,265,874 A 11/1993 Dickinson et al.
5,276,312 A 1/1994 McCarthy
5,282,620 A 2/1994 Keesee
5,294,120 A 3/1994 Schultz
5,294,128 A 3/1994 Marquez
5,324,035 A 6/1994 Morris et al.
5,356,140 A 10/1994 Dabrowski et al.
5,398,932 A 3/1995 Eberhardt et al.
5,401,023 A * 3/1995 Wood .......................... 463/13
5,407,199 A 4/1995 Gumina
5,489,101 A 2/1996 Moody
5,511,781 A 4/1996 Wood et al.
5,531,448 A 7/1996 Moody
5,542,669 A 8/1996 Charron et al.
5,570,885 A 11/1996 Ornstein
5,584,486 A 12/1996 Franklin
5,588,913 A 12/1996 Hecht
5,593,161 A 1/1997 Boylan et al.
5,628,684 A 5/1997 Bouedec
5,630,754 A 5/1997 Rebane
5,667,439 A * 9/1997 Okada ......................... 463/20
5,674,128 A 10/1997 Holch et al.
5,678,001 A 10/1997 Nagel et al.
5,707,285 A 1/1998 Place et al.
5,711,715 A 1/1998 Ringo et al.
5,718,431 A 2/1998 Ornstein
5,722,891 A 3/1998 Inoue
5,732,950 A 3/1998 Moody
5,775,692 A 7/1998 Watts et al.
5,779,545 A 7/1998 Berg et al.
5,791,987 A 8/1998 Chen et al.
5,800,269 A 9/1998 Holch et al.
5,816,916 A 10/1998 Moody
5,823,873 A 10/1998 Moody
5,823,874 A 10/1998 Adams
5,848,932 A 12/1998 Adams
5,868,619 A 2/1999 Wood et al.
5,871,398 A 2/1999 Schneier et al.
5,882,258 A 3/1999 Kelly et al.
5,944,606 A 8/1999 Gerow
5,949,042 A 9/1999 Dietz, II et al.
5,954,335 A 9/1999 Moody
5,954,582 A 9/1999 Zach
5,976,016 A 11/1999 Moody et al.
6,007,066 A 12/1999 Moody
6,007,424 A 12/1999 Evers et al.
6,012,720 A 1/2000 Webb
6,012,981 A 1/2000 Fujioka et al.
6,017,032 A 1/2000 Grippo et al.
6,024,640 A 2/2000 Walker et al.
6,062,980 A 5/2000 Luciano
6,079,711 A 6/2000 Wei et al.
6,089,982 A 7/2000 Holch et al.
6,098,985 A 8/2000 Moody
6,120,378 A 9/2000 Moody et al.
6,126,541 A 10/2000 Fuchs
6,126,542 A 10/2000 Fier
6,132,311 A 10/2000 Williams
6,146,271 A 11/2000 Kadlic
6,146,272 A 11/2000 Walker et al.
6,149,521 A 11/2000 Sanduski
6,159,095 A 12/2000 Frohm et al.
6,168,521 B1 1/2001 Luciano et al.
6,174,233 B1 1/2001 Sunaga et al.
6,183,361 B1 2/2001 Cummings et al.
6,190,255 B1 2/2001 Thomas et al.
6,196,547 B1 3/2001 Pascal et al.
6,203,429 B1 3/2001 Demar et al.
6,210,275 B1 4/2001 Olsen
6,210,276 B1 4/2001 Mullins
6,217,448 B1 4/2001 Olsen
6,220,961 B1 4/2001 Keane et al.
6,241,606 B1 6/2001 Riendeau et al.
6,254,480 B1 7/2001 Zach
6,273,820 B1 8/2001 Haste, III
6,280,328 B1 8/2001 Holch et al.
6,309,298 B1 10/2001 Gerow
6,312,334 B1 11/2001 Yoseloff
6,325,716 B1 12/2001 Walker et al.
6,358,151 B1 3/2002 Enzminger et al.
6,368,218 B2 4/2002 Angell, Jr.
6,371,851 B1 * 4/2002 Singer et al. .................. 463/13
6,402,614 B1 6/2002 Schneier et al.
6,419,583 B1 7/2002 Crumby et al.
6,425,824 B1 7/2002 Baerlocher et al.
6,450,885 B2 9/2002 Schneier et al.
6,454,648 B1 9/2002 Kelly et al.
RE37,885 E 10/2002 Acres et al.
6,475,086 B2 11/2002 Zach
6,508,711 B1 1/2003 Ono
6,524,184 B1 2/2003 Lind et al.
6,527,638 B1 3/2003 Walker et al.
6,533,664 B1 3/2003 Crumby
6,537,150 B1 * 3/2003 Luciano et al. ............... 463/16
6,599,187 B2 7/2003 Gerow
6,607,439 B2 8/2003 Schneier et al.
6,609,974 B2 8/2003 Mead et al.
6,612,927 B1 9/2003 Slomiany et al.
6,619,660 B2 9/2003 Schaefer et al.
6,656,044 B1 12/2003 Lewis
6,676,126 B1 1/2004 Walker et al.
6,685,562 B1 2/2004 Rantanen
6,695,695 B2 2/2004 Angel
6,722,655 B1 4/2004 Camero
6,729,621 B2 5/2004 Moody
6,729,961 B1 5/2004 Millerschone
6,733,385 B1 5/2004 Enzminger et al.
6,749,500 B1 6/2004 Nelson et al.
6,878,060 B2 * 4/2005 Moody ........................ 463/13
6,988,946 B2 * 1/2006 Michaelson et al. ........... 463/17
7,112,133 B2 * 9/2006 Lyons ......................... 463/16
7,326,111 B2 * 2/2008 Enzminger et al. ............ 463/17
2002/0010013 A1 1/2002 Walker et al.
2002/0098882 A1 7/2002 Lind et al.
2002/0098883 A1 7/2002 Packes, Jr. et al.
2002/0196342 A1 12/2002 Walker et al.
2003/0060257 A1 3/2003 Katz et al.
2003/0060261 A1 3/2003 Katz et al.
2003/0060276 A1 3/2003 Walker et al.
2003/0190943 A1 10/2003 Walker et al.
2004/0036212 A1 2/2004 Walker et al.
2004/0038723 A1 2/2004 Schneier et al.

* cited by examiner

INITIAL HAND

INITIAL HAND WITH PLAYER HOLD/DISCARD DATA

FINAL HAND

FINAL HAND

INITIAL HAND

INITIAL HAND WITH PLAYER HOLD/DISCARD DATA

FINAL HAND

FINAL HAND

INITIAL HAND

POTENTIAL REPLACEMENT CARDS

INITIAL HAND WITH PLAYER HOLD/DISCARD DATA

FINAL HAND

FINITE POOL GAMING METHOD AND APPARATUS

BACKGROUND

The present disclosure is generally related to gaming methods and apparatus, and in particular to games in which a game outcome is determined based on game outcome data from a finite pool of game play data.

U.S. Pat. No. 5,324,035 to Morris et al., entitled "Video Gaming System With Fixed Pool of Winning Plays and Global Pool Access," describes a gaming system that includes a central game processor, a plurality of master processing units, and a plurality of slave terminals operable by players to play a game. The central game processor provides pools of game plays to the master processing units. Each pool includes a predetermined number of winning game plays. A player at a slave terminal can purchase a game play, and in response, a master processing unit coupled to the slave terminal retrieves a game play from a pool and sends the game play to the slave terminal. Next, the slave terminal displays a video image of a paper pull-tab lottery ticket being opened to display an outcome of the game play. If the game play corresponds to a winning outcome, the slave terminal credits a corresponding amount to the player.

International Publication No. WO 00/64546, entitled Multi-Level Lottery-Type Gaming Method and Apparatus, describes a lottery-type game system including a game manufacturing computer system connected to a central computer system, which is in turn connected to a plurality of player terminals. The game manufacturing system creates a plurality of game records having a predetermined number of winning game records, and supplies the game records to the central computer system. A player can purchase a first game record via a player terminal, and the first game record is sent to the player terminal. The first game record may be associated with one of four potential outcomes: a losing outcome, an immediate winning outcome, an after draw winning outcome, and a negotiable outcome. After receiving the first game record, the player terminal displays a first level game representation associated with the first game record. The first level game representation is an image of a hand of cards related to a card game such as five card poker.

If the first game record corresponds to an immediate winning outcome, the first level game representation may be an image of a hand of cards such as a straight, a flush, a full house, etc. Then, a prize corresponding to the winning outcome is awarded to the player.

If the first game record corresponds to a losing outcome, the first level game representation displayed by the player terminal may be a hand of cards, such as a pair less than jacks, that indicates no prize is to be awarded. The player may then choose to draw cards via an input device of the player terminal. If the player does draw cards, the first level game representation is modified to show newly drawn cards, but where the new hand of cards also indicates that no prize is to be awarded.

If the first game record corresponds to an after draw winning outcome, the first level game representation may be a hand of cards that appears to be a losing outcome such as a pair less than jacks. The player may then choose to draw cards via an input device of the player terminal. If the player chooses to draw cards, the first level game representation is modified to show newly drawn cards where the new hand of cards indicates that a prize is to be awarded. Then, the prize is awarded to the player.

If the first game record corresponds to a negotiable outcome, the first level game representation may be a hand of cards that appears to be a winning outcome such as a pair of jacks or better, two pair, three of a kind, etc. The player may then choose to draw cards via an input device of the player terminal. If the player chooses to draw cards, a second game record is purchased using the amount that would have been paid based on the outcome associated with the first game record. In response, a second game record is sent to the player terminal.

The second game record may be associated with a second-level winning outcome or a losing outcome. After receiving the second game record, the player terminal displays a second level game representation associated with the second game record. The second level game representation may be a hand of cards including held cards and newly drawn cards that indicate a prize to be awarded. The prize is then provided to the player.

The prize to be awarded may or may not correspond to the second game record. For example, the second game record may correspond to a full house hand of cards, but the player's choice of cards to draw may make a full house hand impossible. If the player's draw selection makes a hand of cards corresponding to a higher prize impossible, the difference between the actual prize awarded and the prize corresponding to the second game record may be put into an "escrow" and subsequently awarded to the player via a "bonus" game.

SUMMARY

In one aspect, a gaming method is provided. The gaming method may comprise receiving data indicative of a final outcome, and displaying an initial set of symbols indicative of the final outcome if the data indicative of the final outcome indicates a winning outcome, the initial set of symbols including an initial winning subset of symbols and an initial non-winning subset of symbols. The gaming method also may comprise receiving player input data indicative of a subset of symbols in the initial set to be discarded, and determining replacement symbols such that a final set of symbols is indicative of the final outcome if the subset of symbols to be discarded includes at least one symbol from the initial winning subset, wherein the final set of symbols includes the replacement symbols in place of the subset of symbols to be discarded. The gaming method additionally may comprise displaying the final set of symbols, and providing an award corresponding to the winning outcome.

In another aspect, a gaming apparatus is provided. The gaming apparatus may include a display unit, a value input device, and a player input device. Additionally, the gaming apparatus may include a controller operatively coupled to the display unit, the value input device, and the player input device, the controller comprising a processor and a memory operatively coupled to the processor. The controller is programmed to request data indicative of a final outcome, and to cause the display unit to display an initial set of symbols indicative of the final outcome if the data indicative of the final outcome indicates a winning outcome, the initial set of symbols including an initial winning subset of symbols and an initial non-winning subset of symbols. The controller is also programmed to receive player input data from the player input device, the player input data indicative of a subset of symbols in the initial set to be discarded, and to determine replacement symbols, such that, if the subset of symbols to be discarded includes at least one symbol from the initial winning subset, a final set of symbols is indicative of the final outcome, wherein the final set of symbols includes the replacement symbols in place of the subset of symbols to be discarded. The controller is additionally programmed to cause the display unit to display the final set of symbols, and to provide an award corresponding to the winning outcome.

In yet another aspect, another gaming method is provided. The gaming method may comprise receiving data indicative of a final outcome via a communications link, and displaying a first hand of cards on a display unit of a gaming unit if the data indicative of the final outcome indicates a winning outcome, the first hand of cards indicative of the final outcome, the first hand of cards including an initial winning subset of cards and an initial non-winning subset of cards. Additionally, the gaming method may comprise receiving player input data indicative of a subset of cards in the initial hand to be discarded, and determining replacement cards such that a final hand of cards is indicative of the final outcome if the subset of cards to be discarded includes at least one card from the initial winning subset, wherein the final hand of cards includes the replacement symbols in place of the subset of symbols to be discarded. The gaming method may also comprise displaying the final hand of cards on the display unit of the gaming unit, and providing an award corresponding to the winning outcome.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
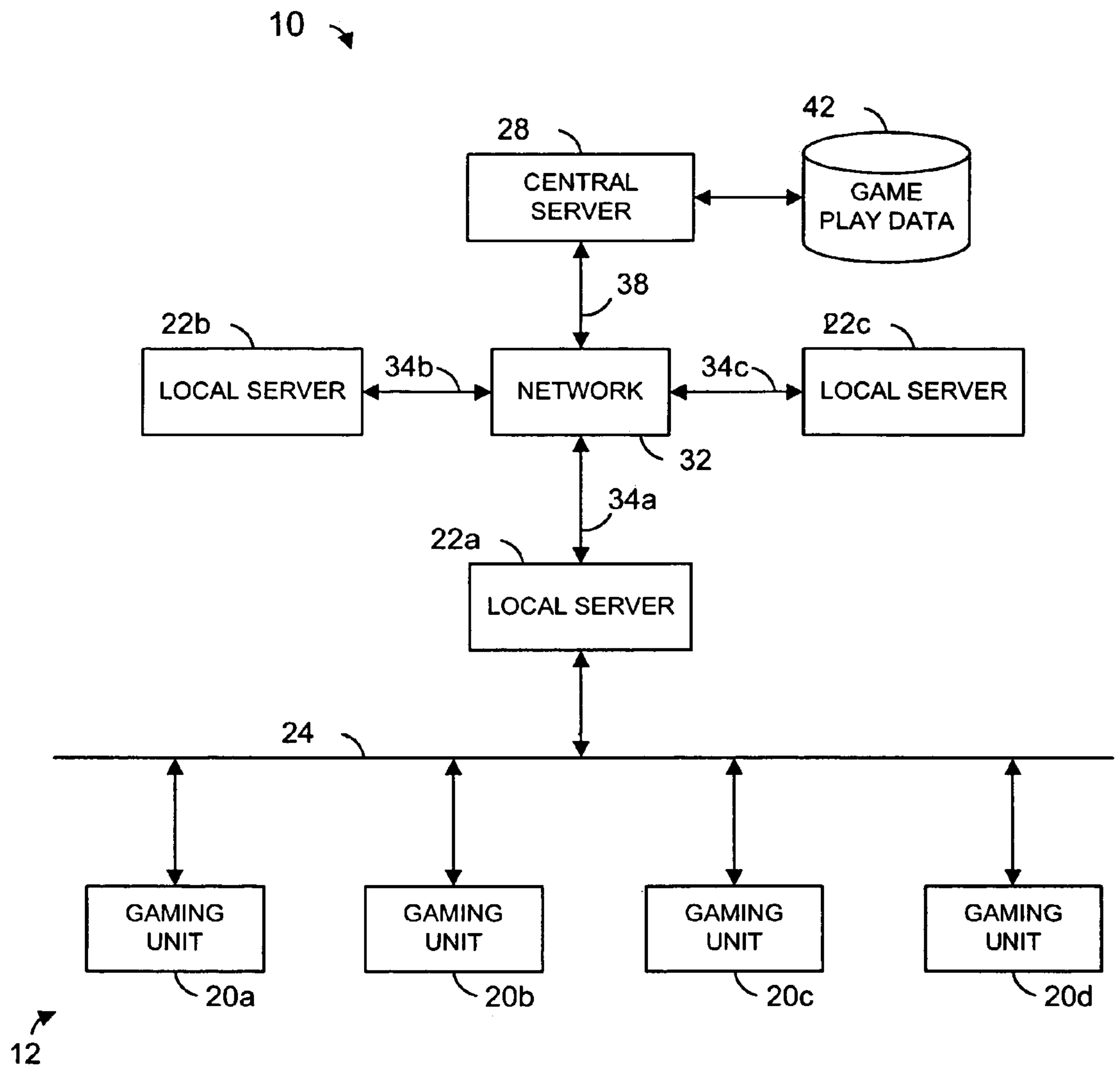
FIG. 1 is a block diagram of an embodiment of a gaming system in accordance with the invention.

FIG. 1 illustrates one possible embodiment of a gaming system 10. Referring to FIG. 1, the gaming system 10 may include one or more groups or networks 12 of gaming units 20*a*, 20*b*, 20*c*, and 20*d* operatively coupled to a local server 22*a* via a network data link 24. The network data link 24 may comprise, for example, a bus, a wired local area network (LAN), a wireless LAN, Bluetooth™ communication links, a wide area network (WAN), etc.

The gaming system 10 may include additional groups or networks of gaming units (not shown) operatively coupled to other local servers 22 (e.g., local server 22*b* and local server 22*c*). The local servers 22 may be coupled to a central server 28 via a network 32, respective communication links 34, and a communication link 38. The network 32 may comprise, for example, a telephone link, a wired LAN, a wireless LAN, Bluetooth™ communication links, a cellular network, a satellite link, a WAN, an intranet, an extranet, the Internet, etc. The network 32 may include a plurality of network computers or server computers (not shown), each of which may be operatively interconnected. The communication links 34 and 38 may each comprise a wired and/or wireless communication link. In another example, the network 32 may be omitted and the central server 28 may be communicatively coupled to the local servers 22 by individual communication links (e.g., wired or wireless communication links).

As one example, the network 12 of gaming units 20*a*, 20*b*, 20*c*, and 20*d* may be provided at a first location in a casino and a second network of gaming units (not shown, but corresponding to local server 22*b*) may be provided at a second location in the casino. As another example, the network 12 of gaming units 20*a*, 20*b*, 20*c*, and 20*d* may be provided at a first location (e.g., a casino, a hotel, a restaurant, a tavern, etc.), and a second network of gaming units (not shown, but corresponding to local server 22*b*) may be provided at a second location (e.g., a casino, a hotel, a restaurant, a tavern, etc.) geographically separate from the first location. For instance, the two casinos may be located in different areas of the same city, or they may be located in different states.

Although the network 12 is shown to include one local server 22*a* and four gaming units 20*a*, 20*b*, 20*c*, and 20*d*, it should be understood that different numbers of servers and gaming units may be utilized. For example, the network 12 may include a plurality of local servers and tens or hundreds of gaming units 20, all of which may be interconnected via the network data link 24. Although the data link 24 is shown as a single data link 24, the data link 24 may comprise multiple data links.

The central server 28 may be coupled to a database 42 which stores finite pools of game play data. Each finite pool of game play data corresponds to a set of predetermined outcomes of a game, including winning outcomes and losing outcomes. The finite pool of game play data may comprise game outcome data corresponding to each outcome in the set of predetermined outcomes. In one embodiment, the central server 28 may generate the finite pools of game play data and store the data in the database 42. In another embodiment, one or more of the finite pools of game play data may be generated other than by the central server 28. In this embodiment, the finite pools of game play data may be stored in the database 42 via the central server 28 or via some other processing device coupled to the database 42 (e.g., a database server separate from the central server 28 (not shown)).

The central server 28 may retrieve a finite pool of game play data from the database 42 and send the finite pool of game play data to a local server 22. Each local server 22 may store finite pools of game play data received from the central server 28 in a memory of (or coupled to) the local server 22.

Each local server 22 may receive game play requests from gaming units communicatively coupled to the local server 22 and, in response to such requests, may retrieve game outcome data from a finite pool stored in the memory of the local server 22. After retrieving game outcome data from a finite pool, the local server 22 may send the game outcome data to the requesting gaming unit 20. For example, the local server 22*a* may have stored in a memory associated with the local server 22*a* a finite pool of game play data. If the gaming unit 20*a* requests a game outcome, the local server 22*a* may retrieve game outcome data corresponding to one outcome from the finite pool, and transmit the game outcome data to the gaming unit 20*a*. The local server 22*a* (or some other processing device) may mark (or otherwise indicate that) the game outcome data retrieved from the finite pool as read. Then, if another gaming unit 20 requests a game outcome, the local server 22*a* may retrieve unread game outcome data corresponding to another outcome from the finite pool, and transmit the game outcome data to the gaming unit 20. This retrieved game outcome data will also be marked as read.

Once all the game outcome data from the finite pool has been read, the local server 22*a* may begin retrieving game outcome data from another finite pool stored in the memory of the local server 22*a*. If the local server 22*a* does not have any more finite pools having unread game outcome data, the local server 22*a* may request one or more new finite pools from the central server 28.

A player may choose to play a game of chance such as poker, blackjack, other types of card games, or any games of chance and the like, via a gaming unit 20. When a player chooses to play a game, the gaming unit 20 may request game outcome data from its associated local server 22. After receiving game outcome data, the gaming unit 20 may indicate to the player the outcome corresponding to the received game outcome data. For example, the gaming unit 20 may display on a display unit an image of a hand of cards that is indicative of the outcome. In particular, if the outcome indicates the player has won an award, the displayed hand of cards may be a hand of cards equal to or above a minimum value (e.g., a hand of cards equal to or above three of a kind). Also, the displayed hand of cards may be indicative of the amount of the award (e.g., four of a kind indicates a higher award than three of a kind). If the outcome indicates the player has not won an award, the displayed hand of cards may be a losing hand (e.g., a hand of cards below three of a kind).

In some embodiments, the central server 28 may be omitted. For instance, finite pools of game play data may be stored at each local server 22 in a memory of the local server 22, in a database communicatively coupled to the local server 22, etc. In other embodiments, each gaming unit 20 may store one or more finite pools of game play data in a memory of the gaming unit 20, in a database communicatively coupled to the gaming unit 20, etc. In other embodiments, one or more local servers 22 may be omitted. For instance, some or all gaming units 20 may be communicatively coupled to the central server 28 (e.g., via the internet, a LAN, a WAN, a satellite link, a cable television link, a telephone link, etc.).

Central Server Electronics

The central server 28 may comprise a computer such as a desk top computer, a lap top computer, a work station, a server, a mainframe, etc. Although in FIG. 1, the central server 28 is illustrated as being separate from the local servers 22 and the gaming units 20, the central server 28 may be implemented by, for example, one of the local servers 22 and/or one of the gaming units 20.

Figure 2:
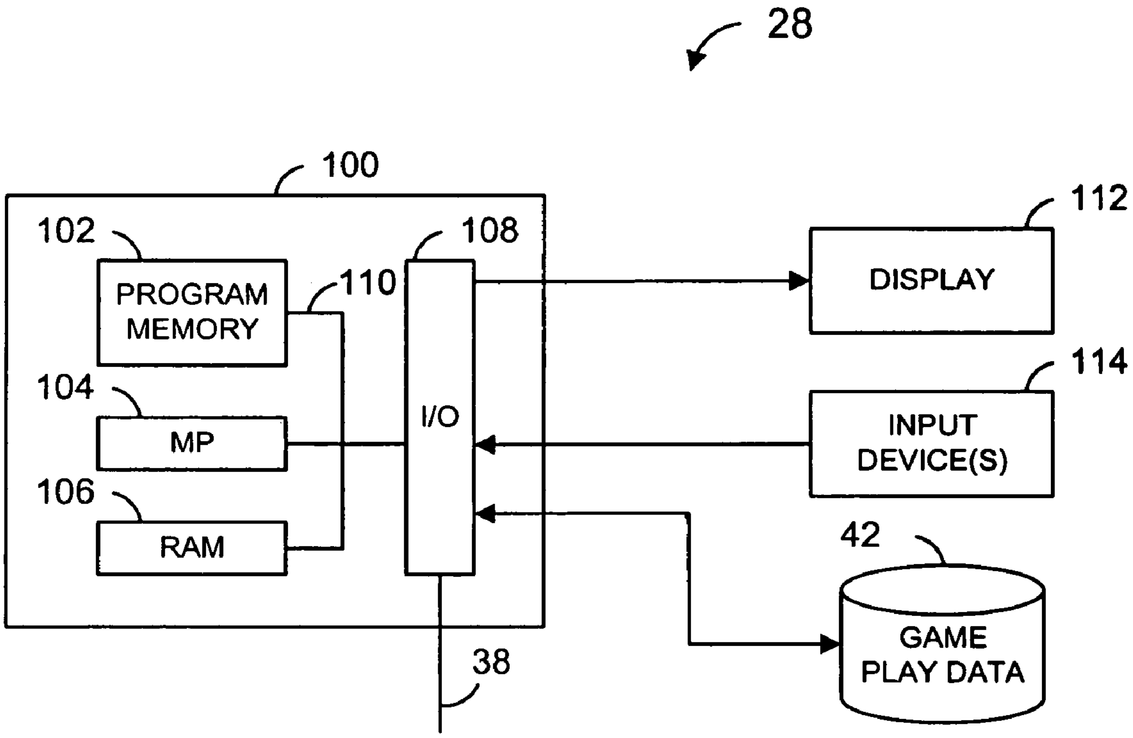
FIG. 2 is a block diagram of the electronic components of a central server shown schematically in FIG. 1.

FIG. 2 is a block diagram of a number of components that may be incorporated in one embodiment of the central server 28. The central server 28 may include a controller 100 that may comprise a program memory 102, a microcontroller or microprocessor (MP) 104 (hereinafter referred to as microprocessor 104), a random-access memory (RAM) 106, and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memory (or memories) 102 may be implemented as semiconductor memories, magnetically readable memories, and/or optically readable memories, for example. The program memory 102 may be a RAM, a ROM, a read/write or alterable memory such as a hard disk, etc. In the event a hard disk is used as a program memory 102, the address/data bus 110 shown schematically in FIG. 2 may comprise multiple address/data buses, which may be of different types, and there may be an I/O circuit disposed between the address/data buses.

A display 112, one or more input devices 114, and the database 42 may be operatively coupled to the I/O circuit 108, each of those components being so coupled by either a unidirectional or bidirectional, single-line or multiple-line data link, which may depend on the design of the component that is used. As shown in FIG. 2, the components 112, 114, and 42 may be coupled to the I/O circuit 108 via respective direct links. Different connection schemes could be used. For example, these components may be coupled to the I/O circuit 108 via a common bus or other data link that is shared by a number of components. Furthermore, some of the components may be directly coupled to the microprocessor 104 without passing through the I/O circuit 108.

Local Server Electronics

Each local server 22 may comprise a computer such as a desk top computer, a lap top computer, a work station, a server, a mainframe, etc. Each local server 22 may comprise components similar to those of the central server 28 illustrated in FIG. 2. In some embodiments, a local server 22 may store one or more finite pools of game play data in a memory similar to the memory 106 or another type of memory. In other embodiments, a local server 22 may store one or more finite pools of game play data in a database coupled to the local server 22 similar to the database 42 being coupled to the central server 28.

Gaming Units

Figure 3A:
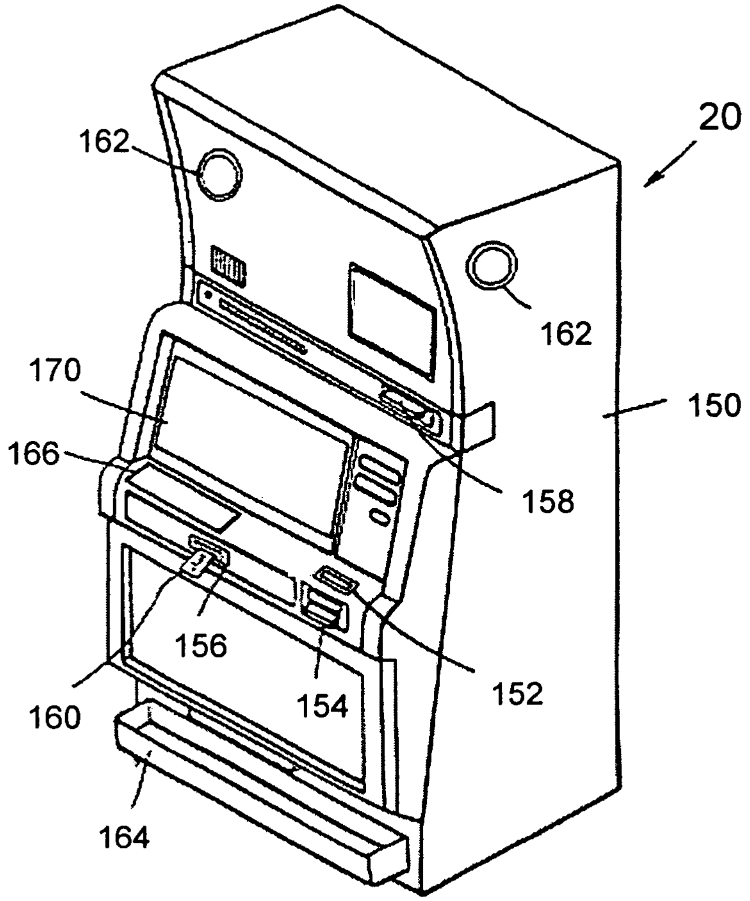
FIG. 3A is a perspective view of an embodiment of one of the gaming units shown schematically in FIG. 1.

FIG. 3A is a perspective view of one possible embodiment of one or more of the gaming units 20. It should be understood that the design of one or more of the gaming units 20 may be different than the design of other gaming units 20. Some gaming units 20 may be any type of casino gaming unit and may have various different structures and methods of operation. Additionally, other gaming units 20 may be a casino gaming unit, or may be a general purpose computer (e.g., a desk top computer, lap top computer, tablet computer, server, work station, main frame, personal digital assistant (PDA), cellular phone, etc.). Further some gaming units 20 may be incorporated into other devices such as a cable or satellite set-top box, a video game system (e.g., a PLAYSTATION 1™ or PLAYSTATION 2™ video game system from Sony, an XBOX™ video game system from Microsoft, a GAMECUBE™ video game system from Nintendo, etc.), a hand-held game system (e.g., a GAME BOY™ hand-held game system from Nintendo), etc. Various example designs and configurations of the gaming units 20 are described below, but it should be understood that numerous other designs may be utilized.

Referring to FIG. 3A, one example of a gaming unit 20 may include a housing or cabinet 150 and one or more input devices, which may include a coin slot or acceptor 152, a paper currency acceptor 154, a ticket reader/printer 156 and a card reader and/or writer (hereinafter "card reader/writer") 158, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 156 may be used to read and/or print or otherwise encode ticket vouchers 160. The ticket vouchers 160 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 160 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 160 could be printed with an optically readable material such as ink, or data on the ticket vouchers 160 could be magnetically encoded. The ticket reader/printer 156 may be provided with the ability to both read and print ticket vouchers 160, or it may be provided with the ability to only read or only print or encode ticket vouchers 160. In the latter case, for example, some of the gaming units 20 may have ticket printers 156 that may be used to print ticket vouchers 60, which could then be used by a player in other gaming units 20 that have ticket readers 156.

If provided, the card reader/writer 158 may include any type of card reading and/or writing device, such as a magnetic card reader or an optical card reader, and may be used to read (and, optionally, write) data from (to) a card offered by a player, such as a credit card, a player tracking card, a PC card, a smart card, etc. If provided for player tracking purposes, the card reader/writer 158 may be used to read data from, and/or write data to, player tracking cards that are capable of storing data representing the identity of a player, the identity of a casino, the player's gaming habits, etc.

The gaming unit 20 may include one or more audio speakers 162, a coin payout tray 164, an input control panel 166 and a display unit 170 for displaying display data relating to the game or games provided by the gaming unit 20. The audio speakers 162 may generate audio representing sounds such as the noise of spinning slot machine reels, a dealer's voice, music, announcements or any other audio related to a casino game. The input control panel 166 may be provided with a plurality of pushbuttons or touch-sensitive areas that may be pressed by a player to select games, make wagers, make gaming decisions, etc. The display unit 170 may be two dimensional display unit such as a color video display unit displaying images. Additionally, the display unit 170 may include a three dimensional display unit such as a holographic display, a stereoscopic display, a three dimensional display volume, etc.

Figure 3B:
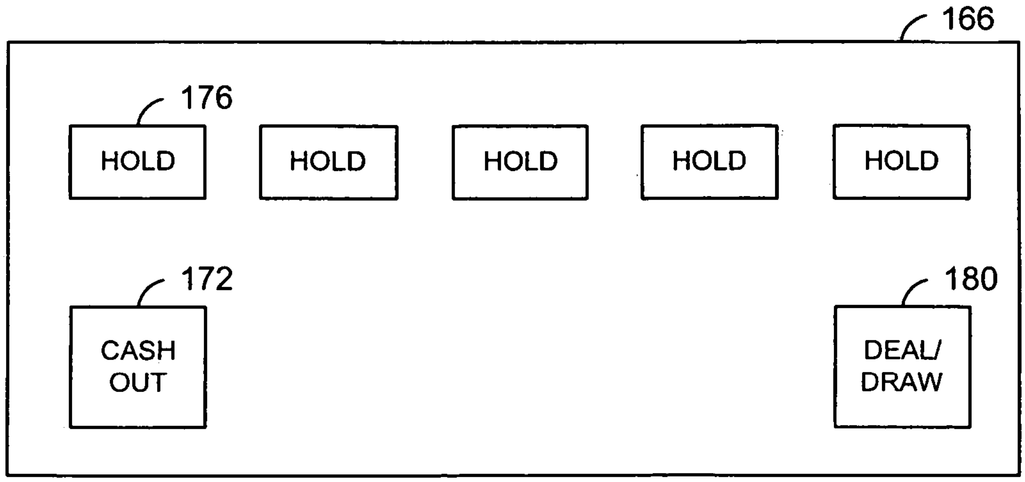
FIG. 3B illustrates an embodiment of a control panel for a gaming unit.

FIG. 3B illustrates one possible embodiment of the control panel 166, which may be used where the gaming unit 20 is configured to permit play of a poker-type game. In this embodiment, the control panel 166 may include a "Cash Out" button 172 that may be activated by a player when the player decides to terminate play on the gaming unit 20, in which case the gaming unit 20 may return value to the player, such as by returning a number of coins to the player via the payout tray 164. As used herein, the term "button" is intended to encompass any device that allows a player to make an input, such as an input device that must be depressed to make an input selection or a display area that a player may simply touch, select with a mouse, etc.

If the gaming unit 20 permits play of a game in which a player may choose to hold or discard cards, the control panel 166 may be provided with a plurality of hold buttons 176, each of which allows the player to select a corresponding card in a hand of cards that the player wishes to hold. For example, five buttons 176 may be provided, each of which may allow a player to hold a respective card in a five card hand. The control panel 166 may include a "Deal/Draw" button 180 to allow a player to initiate a deal of a hand and/or to draw new cards for the hand.

In FIG. 3B, a rectangle is shown around the buttons 172, 176, and 180. It should be understood that that rectangle simply designates, for ease of reference, an area in which the buttons 172, 176, and 180 may be located. Consequently, the term "control panel" should not be construed to imply that a panel or plate separate from the housing 150 of the gaming unit 20 is required, and the term "control panel" may encompass a plurality or grouping of player activatable buttons.

Although one possible control panel 166 is described above, it should be understood that different buttons could be utilized in the control panel 166, and that the particular buttons used may depend on the game or games that could be played on the gaming unit 20. Although the control panel 166 is shown to be separate from the display unit 170, it should be understood that the control panel 166 could be generated by the display unit 170. In that case, each of the buttons of the control panel 166 could be a colored area generated by the display unit 170, and some type of mechanism may be associated with the display unit 170 to detect when each of the buttons was activated, such as a touch-sensitive screen, a touch-sensitive pad, a mouse, a trackball, a joystick, etc.

Gaming Unit Electronics

Figure 4:
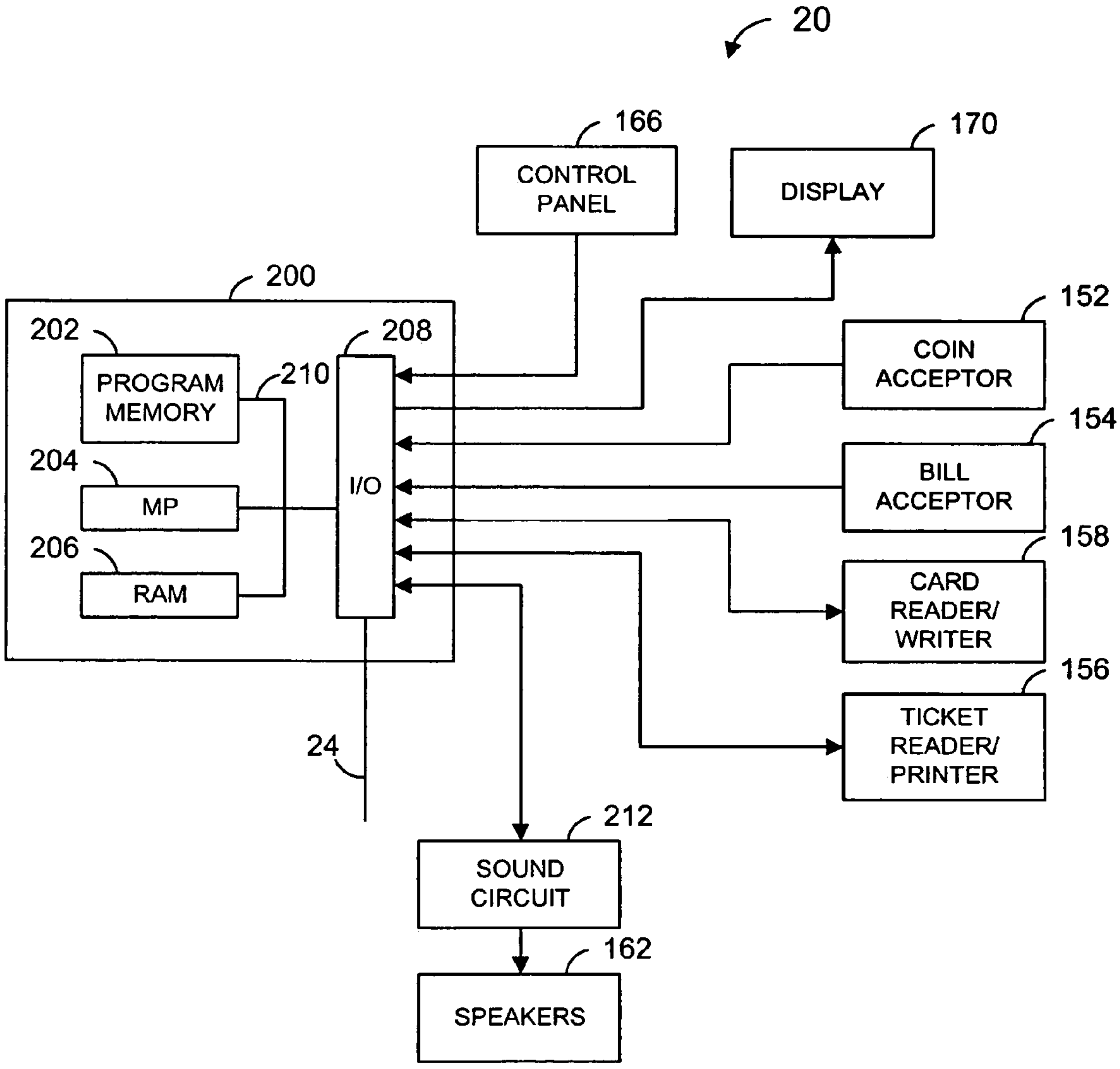
FIG. 4 is a block diagram of the electronic components of the gaming unit of FIG. 3A.

FIG. 4 is a block diagram of a number of components that may be incorporated with the gaming unit 20. The gaming unit 20 may include a controller 200 that may comprise a program memory 202, a microcontroller or microprocessor (MP) 204 (hereinafter referred to as microprocessor 204), a random-access memory (RAM) 206, and an input/output (I/O) circuit 208, all of which may be interconnected via an address/data bus 210. It should be appreciated that although only one microprocessor 204 is shown, the controller 200 may include multiple microprocessors 204. Similarly, the memory of the controller 200 may include multiple RAMs 206 and multiple program memory (or memories 202). Although the I/O circuit 208 is shown as a single block, it should be appreciated that the I/O circuit 208 may include a number of different types of I/O circuits. The RAM(s) 206 and program memories 202 may be implemented as semiconductor memories, magnetically readable memories, and/or optically readable memories, for example.

The program memory 202 may include a RAM, a read-only memory (ROM) 102, a read/write or alterable memory, such as a hard disk, etc. In the event a hard disk is used as a program memory, the address/data bus 210 shown schematically in FIG. 4 may comprise multiple address/data buses, which may be of different types, and there may be an I/O circuit disposed between the address/data buses.

FIG. 4 illustrates that the control panel 166, the coin acceptor 152, the bill acceptor 154, the card reader 158, the ticket reader/printer 156, and the display unit 170 may be operatively coupled to the I/O circuit 208, each of those components being so coupled by either a unidirectional or bidirectional, single-line or multiple-line data link, which may depend on the design of the component that is used. The speaker(s) 162 may be operatively coupled to a sound circuit 212, that may comprise a voice- and sound-synthesis circuit or that may comprise a driver circuit. The sound-generating circuit 212 may be coupled to the I/O circuit 208.

As shown in FIG. 4, the components 152, 154, 156, 158, 166, 170, 212 may be coupled to the I/O circuit 208 via a respective direct line or conductor. Different connection schemes could be used. For example, one or more of the components shown in FIG. 4 may be coupled to the I/O circuit 208 via a common bus or other data link that is shared by a number of components. Furthermore, some of the components may be directly coupled to the microprocessor 204 without passing through the I/O circuit 208.

In some embodiments, a gaming unit 20 may store game outcome data received from the local server 22 in the memory 206. In other embodiments, a gaming unit 20 may store one or more finite pools of game play data in the memory 206 or another type of memory. In still other embodiments, a gaming unit 20 may store one or more finite pools of game play data in a database coupled to the gaming unit 20 similar to the database 42 of FIGS. 1 and 2.

Although the example gaming unit 20 described with reference to FIGS. 3A, 3B, and 4 is generally a casino gaming machine, some or all of the gaming units 20 may be a general purpose computer, cell phone, PDA, set top box, etc. These gaming units need not, for example, be incorporated in a casino game housing, or include many of the components described with reference to FIG. 4 (e.g., coin acceptor 152, bill acceptor 154, ticket reader/writer 156, etc.). Additionally, such a gaming unit 20 may include other components such as a keyboard, key pad, mouse, joystick, etc.

Additionally, although the example gaming unit 20 described with reference FIG. 3A is generally a floor-based casino gaming machine, some or all of the gaming units 20 may be casino gaming machine configured for placement on, for example, a desk top, table top, etc. Further, a gaming unit may be incorporated into a table, a wall, etc.

Overall Operation of Gaming Unit

One manner in which one or more of the gaming units 20 may operate is described below in connection with a number of flowcharts which represent a number of portions or routines of one or more computer programs, which may be stored in one or more of the memories of the controller 200. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the servers 22, 28) having a memory in which the computer program portions are stored. The computer program portions may be written in any high level language such as C, C++, C#, Java or the like or any low-level assembly or machine language. By storing the computer program portions therein, various portions of the memories 202, 206 are physically and/or structurally configured in accordance with computer program instructions.

Figure 5:
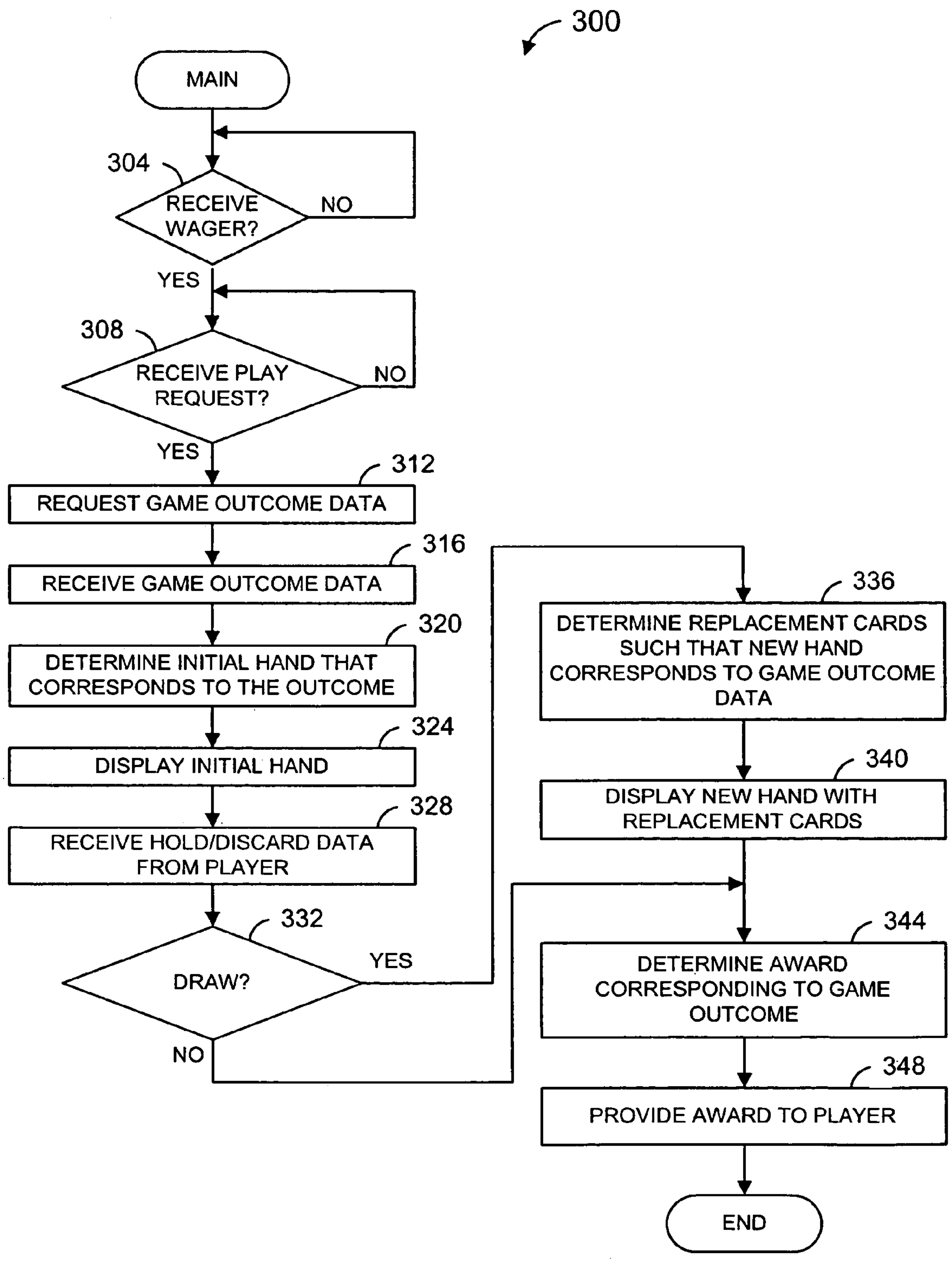
FIG. 5 is a flowchart of an embodiment of a main routine that may be performed during operation of one or more of the gaming units.

FIG. 5 is a flowchart of a game play routine 300 that may be stored in the memory of the controller 200. Referring to FIG. 5, the game play routine 300 may begin operation at a block 304 during which the gaming unit 20 may wait to receive a wager from a player. For example, the gaming unit 20 may wait until the player submits value via the coin acceptor 152, the bill acceptor 154, the card reader/writer 158, or the ticket reader/printer 156 (FIG. 1). After a wager is received, the routine 300 may proceed to a block 308 at which the gaming unit 20 may wait to receive a request to play a game from the player. For example, the player may activate the deal/draw button 180 (FIG. 3B) indicating a desire to play the game. After the request is received, the flow may proceed to a block 312.

At the block 312, the controller 200 may request game outcome data from a finite pool of game play data. The game outcome data may correspond to a single outcome from the plurality of outcomes defined by the finite pool of game play data. If a finite pool of game play data is stored at the gaming unit 20 (e.g., in a memory of or coupled to the gaming unit 20), the controller 200 may request game outcome data from that finite pool of game play data. If a finite pool of game play data is stored the local server 22, the controller 200 may request game outcome data from the local server 22. Similarly, the gaming unit 20 may request game outcome data from the central server 28.

At a block 316, the game outcome data requested at the block 312 may be received. For example, the game outcome data may be received from a memory or database associated with the gaming unit 20, from the local server 22, from the central server 28, etc. The game outcome data received at the block 316 may specify a single outcome of the game. More specifically, the received game outcome data may specify, or it may be determined based on the received game outcome data, whether the player is to win an award and, if so, the value of the award.

At a block 320, an initial hand of cards that corresponds to the received game outcome data may be determined. The initial hand of cards may be determined in a variety of ways. In some embodiments, data associated with the game outcome data may be received from the central server 28 or the local server 22 (FIG. 1), for example, that may specify a particular initial hand of cards, and the initial hand of cards may be determined based on this data. In other embodiments, the initial hand of cards may be determined, for example, via a look up table stored in the controller 200 (FIG. 4) and using the game outcome data received at the block 316. Such a look up table may be received from the central server 28 (FIG. 1), the local server 22 (FIG. 1), some other device, etc.

The initial hand should indicate the value of the award, if any, to be awarded to the player. For example, different values of poker hands may correspond to awards of different values. Additionally, the value of a hand may increase as the value of the award increases.

Figure 6A:
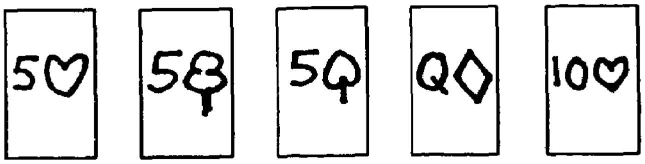
FIG. 6A is an illustration of an example image that may be displayed during performance of the routine of FIG. 5.

At a block 324, the initial hand may be displayed to the player. Referring to FIGS. 3A and 4, the initial hand may be displayed on the display 170 of the gaming unit 20, for example. FIG. 6A is an example image of an initial hand of cards that may be displayed to the player. The hand of cards of FIG. 6A includes a three-of-a-kind, which may indicate to the player a value of an award won by the player. The hand of cards of FIG. 6A includes a subset of winning cards and a subset of non-winning cards. In particular, the subset of winning cards includes the three "fives", and the subset of non-winning cards includes the "queen" and the "ten".

As will be discussed in more detail below, the player may be given the option of discarding one or more cards, and receiving newly "dealt" cards. However, as the amount of the player's award was determined by the game outcome data received at the block 316, the amount of the award will not be changed by the newly "dealt" cards. Referring to FIG. 6A, for example, if the player discards the queen of diamonds and ten of hearts, replacement cards "dealt" to the player are determined such that the hand remains a three-of-a-kind. In other words, even though the player may think he or she can increase the award by discarding and receiving new cards, the amount of the award ultimately awarded to the player is the same as that indicated by the initial hand. The player may choose to discard winning symbols (e.g., the "fives") and/or non-winning symbols (e.g., the "queen" and "ten"). In any case, replacement symbols may be determined such that the award indicated by the new set of symbols that will include the replacement symbols remains the same.

At a block 328, hold/discard data may be received from the player via an input device. Referring to FIG. 3B, the player may indicate which cards he/she wishes to hold/discard by activating corresponding hold buttons 176. If the player input data indicates that the player wishes to hold particular ones of the cards, data indicative of which of the cards are to be "held" may be stored in the controller 200. Additionally or alternatively, if the player input data indicates that the player wishes to discard particular ones of the cards, data indicative of which of the cards are to be discarded may be stored in the controller 200.

Figure 6B:
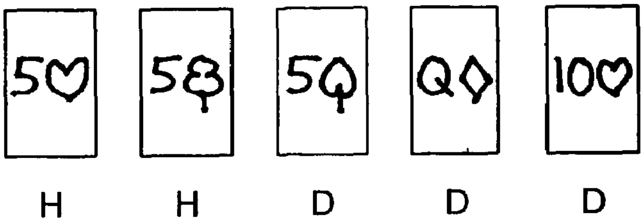
FIG. 6B is an illustration of player hold/discard data associated with the example image of FIG. 6A.

FIG. 6B illustrates the initial hand of FIG. 6A along with player hold/discard data associated with each card of the hand. The player hold/discard data of FIG. 6B indicates that the player wishes to discard a subset of the cards: the five of spades, the queen of diamonds, and the ten of hearts. This subset includes one of the winning cards (the five of spades) as well as the non-winning cards (the queen of diamonds and the ten of hearts).

At a block 332, it may be determined if the player wishes a "draw." Referring to FIG. 3B, it may be determined if the player activated the "Deal/Draw" button 180 and if the player indicated that particular cards are to be discarded, for example. Also, it may be determined if the player activated the "Cash Out" button 172. This may indicate that the player does not wish a "draw." If it is determined that the player wishes a "draw," the flow may proceed to a block 336.

At the block 336, new cards to replace the cards discarded by the player may be determined such that the hew hand having the replacement cards corresponds to the game outcome data received at block 316. Referring to FIG. 6B, the hold/discard data indicates that the player wishes to discard three cards including one of the winning cards. Thus, three replacement cards should be determined such that the new hand will correspond to the game outcome data received at block 316. For example, one of the new cards to be determined may be a card to complete the three-of-a-kind hand. Additionally, the two other new cards may be determined such that the new hand does not indicate a different award than that corresponding to the game outcome data received at block 316. For example, the two other new cards should not cause the new hand to be a full house or a four-of-a-kind. Embodiments of methods that may be used to determine new cards to replace discarded cards will be discussed below.

Figure 6C:
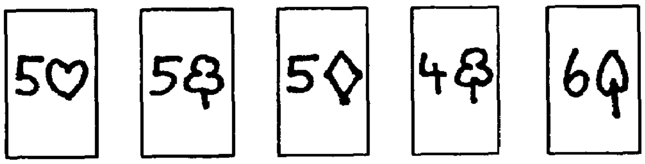
FIG. 6C is an illustration of another example image that may be displayed during performance of the routine of FIG. 5.

At a block 340, a new hand that includes the replacement cards determined at block 336 and which does not include the cards that the player indicated should be discarded at blocks 328 and 332 is displayed. Referring to FIGS. 3A and 4, the initial hand may be displayed on the display 170 of the gaming unit 20, for example. FIG. 6C is an example image of a new hand of cards that may be displayed to the player. The new hand of cards of FIG. 6C corresponds to the hand of cards of FIGS. 6A and 6B. In particular, the new hand of cards of FIG. 6C includes the five of hearts and the five of clubs from the initial hand (FIG. 6A), as well replacement cards: the five of diamonds, the four of clubs and the six of spades, which replace the five of spades, the queen of diamonds, and the ten of spades, respectively, of the initial hand (FIG. 6A). Referring now to FIG. 6B, the player chose to replace one winning card (the five of spades) and two non-winning cards (the queen of diamonds and the ten of hearts). The replacement cards include one winning card (the five of diamonds) and two non-winning cards (the four of clubs and the six of spades).

After the block 340, and if at the block 332 it is determined that the player does not wish a "draw," the flow may proceed to a block 344. At the block 344, an award may be determined that corresponds to the game outcome data received at the block 316. The award may be determined in a variety of ways. In some embodiments, data may be received from the central server 28 or the local server 22 (FIG. 1), for example, that may specify an award associated with the game outcome data received at the block 316, and the award may be determined based on this data. In other embodiments, the award may be determined, for example, via a look up table stored in the controller 200 (FIG. 4) and using the game outcome data. Such a look up table may be received from the central server 28 (FIG. 1), the local server 22 (FIG. 1), some other device, etc.

At a block 348, the award may be provided to the player in a variety of ways. Referring to FIGS. 3A and 4, the award may be provided, for example, via a ticket voucher 160, the card reader/writer 158, the coin payout tray, etc. Additionally, the award may be provided to the player in the form of credits that the player may use to play further games on the gaming unit 20 or some other gaming unit. If the player wishes to "cash out" the credits, the player may activate the cash out button 172 (FIG. 3B), for example, and receive value via any number of value media (e.g., cash, a voucher for cash or a prize, value added to a smart card, etc.).

Determining Replacement Cards

Examples of methods in which one or more of the gaming units 20 may operate are described below in connection with a number of flowcharts which represent a number of portions or routines of one or more computer programs, which may be stored in one or more of the memories of the controller 200. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the servers 22, 28) having a memory in which the computer program portions are stored. The computer program portions may be written in any high level language such as C, C++, C#, Java or the like or any low-level assembly or machine language. By storing the computer program portions therein, various portions of the memories 202, 206 are physically and/or structurally configured in accordance with computer program instructions.

Figure 7:
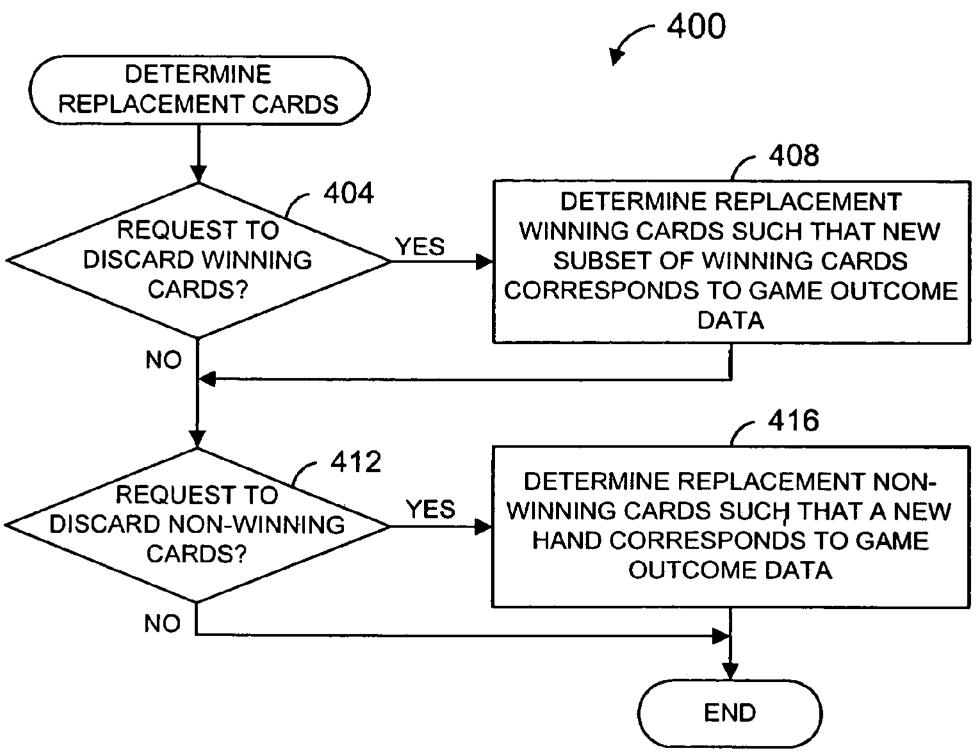
FIG. 7 is a flowchart of an embodiment of a routine for determining replacement cards.

As discussed above, new cards to replace the cards discarded by the player may be determined such that the new hand having the replacement cards corresponds to the game outcome data received at block 316. The replacement cards may be determined in a variety of ways. FIG. 7 is a flow diagram of one embodiment of a routine 400 that may be used to determine the replacement cards. At a block 404, it may be determined whether the player requested to discard one or more of the winning cards. For example, referring to FIG. 6A, it may be determined if the player requested to discard any of the "five" cards of the initial hand.

Figure 8:
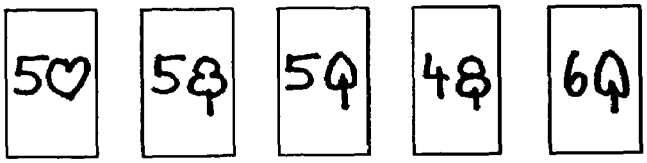
FIG. 8 is an illustration of yet another example image that may be displayed during performance of the routine of FIG. 5.

If the player did request to discard one or more of the winning cards, the flow may proceed to a block 408. At the block 408, replacement winning cards may be determined such that a subset of winning cards including the replacement winning cards corresponds to the game outcome data. For example, referring to FIG. 6B, the player has requested that the five of spades be discarded. A replacement card may be determined such that a subset of winning cards including the replacement card and the five of hearts and the five of clubs corresponds to the game outcome data. Referring to FIG. 6C, the five of diamonds is such a replacement card. Although in FIG. 6C the replacement winning card is different than the discarded winning card, in some examples, one, more, or all of the discarded winning cards may be replaced by the same winning cards. For example, FIG. 8 is an image of a final hand that corresponds to the initial hand and hold/discard data of FIGS. 6A and 6B. In the example of FIG. 8, the five of spades from the initial hand (FIG. 6A) has been replaced with the five of spades. In this example, the discarded five of spades could be considered as being added back to the deck and then re-drawn as the replacement five of spades. Also, the replacement five of spades could be considered as being drawn from a second deck. In one example, determining replacement winning cards may comprise determining a replacement card as the same card when a different replacement winning card cannot be determined such that the new subset of winning cards corresponds to the game outcome data.

After the block 408 or if it is determined at the block 404 that the player did not request to discard one or more of the winning cards, the flow may proceed to a block 412. At a block 412, it may be determined whether the player requested to discard one or more of the non-winning cards. For example, referring to FIG. 6A, it may be determined if the player requested to discard one or both of the queen of diamonds or the ten of hearts.

If the player did request to discard one or more of the non-winning cards, the flow may proceed to a block 416. At the block 416, replacement non-winning cards may be determined such that a new hand having the replacement winning cards determined at the block 408 corresponds to the game outcome data. For example, referring to FIG. 6B, the player has requested that both the queen of diamonds and the ten of hearts be discarded. Replacement cards may be determined such that the new hand corresponds to the game outcome data. In the example of FIG. 6B, the replacement non-winning cards should not cause a new hand to be a four of a kind or a full house. Thus, neither of the replacement non-winning cards should be a "five" card, and the replacement non-winning cards should not be a pair. Referring to FIG. 6C, the four of clubs and the six of spades are such replacement cards.

Figure 9:
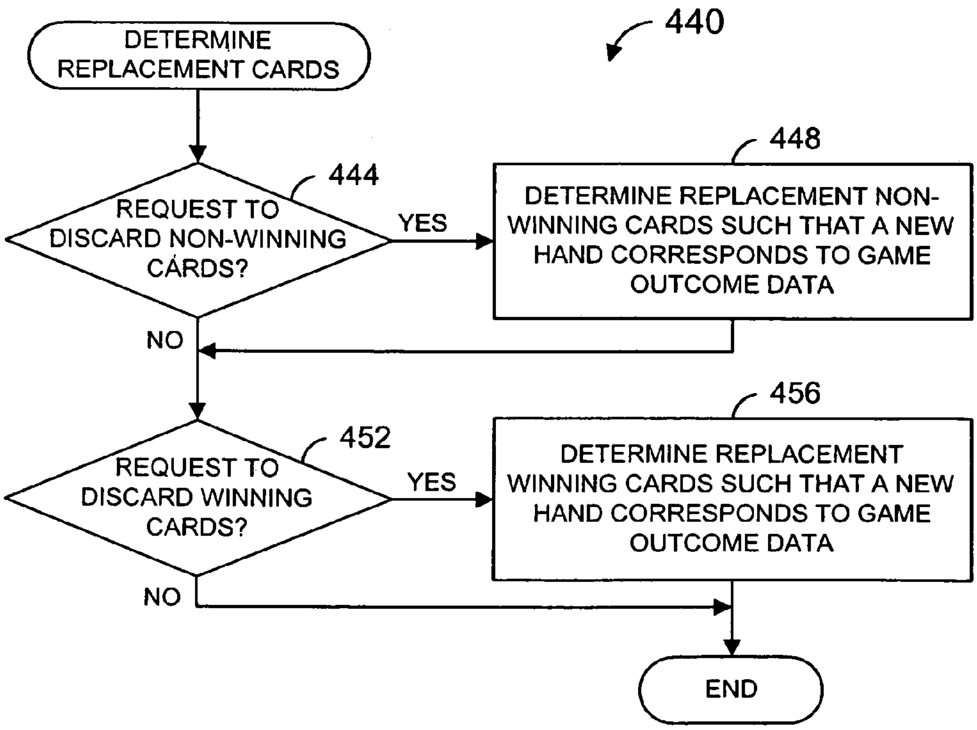
FIG. 9 is a flowchart of another embodiment of a routine for determining replacement cards.

FIG. 9 is a flow diagram of another embodiment of a routine 440 that may be used to determine the replacement cards. At a block 444, it may be determined whether the player requested to discard one or more of the non-winning cards. For example, referring to FIG. 6A, it may be determined if the player requested to discard one or both of the queen of diamonds or the ten of hearts.

If the player did request to discard one or more of the non-winning cards, the flow may proceed to a block 448. At the block 448, replacement non-winning cards may be determined such that a new hand having the replacement non-winning cards the winning subset of cards corresponds to the game outcome data. For example, referring to FIG. 6B, the player has requested that both the queen of diamonds and the ten of hearts be discarded. Replacement cards may be determined such that a new hand having the five of hearts, the five of clubs, the five of spades, and the replacement non-winning cards corresponds to the game outcome data. In the example of FIG. 6B, the replacement non-winning cards should not cause a new hand to be a four of a kind or a full house. Thus, neither of the replacement non-winning cards should be a "five" card, and the replacement non-winning cards should not be a pair. Referring to FIG. 6C, the four of clubs and the six of spades are such replacement cards.

After the block 448 or if it is determined at the block 444 that the player did not request to discard one or more of the non-winning cards, the flow may proceed to a block 452. At the block 452, it may be determined whether the player requested to discard one or more of the winning cards. For example, referring to FIG. 6A, it may be determined if the player requested to discard any of the "five" cards of the initial hand.

If the player did request to discard one or more of the winning cards, the flow may proceed to a block 456. At the block 456, replacement winning cards may be determined such that a new hand including the replacement winning cards and the replacement non-winning cards determined at the block 448 corresponds to the game outcome data. For example, referring to FIG. 6B, the player has requested that the five of spades be discarded. Referring to FIG. 6C, the five of diamonds is such a replacement winning card such that the new hand corresponds to the game outcome data. Similar to the block 408 of FIG. 7, in some examples, one, more, or all of the discarded winning cards may be replaced by the same winning cards.

In other embodiments, the blocks 404 and 408 of FIG. 7 or the blocks 452 and 456 of FIG. 9 may be omitted. In these embodiments, discarded winning cards are not discarded or are merely replaced by the same cards. Referring again to FIG. 8, the final hand of FIG. 8 is the same as that of FIG. 6C except that in FIG. 8, the five of spades from the initial hand has not been replaced, or has been replaced with the same card.

Figure 10A:
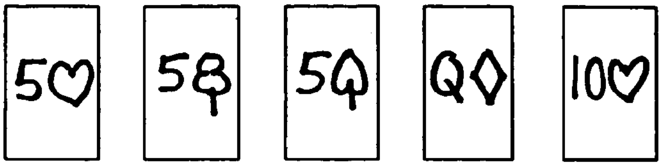
FIG. 10A is an illustration of an example image that may be displayed during performance of the routine of FIG. 5.
Figure 10B:
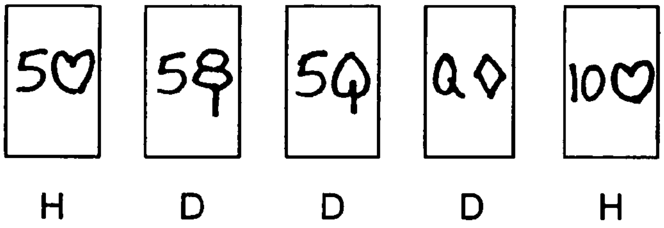
FIG. 10B is an illustration of player hold/discard data associated with the example image of FIG. 10A.
Figure 10C:
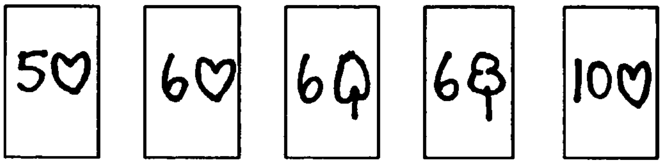
FIG. 10C is an illustration of another example image that may be displayed during performance of the routine of FIG. 5.

In some examples, a discarded non-winning card may be replaced by a winning card. FIG. 10A is an image of an initial hand having three fives, and FIG. 10B illustrates player hold/discard data corresponding to the hand of FIG. 10A. FIG. 10C is an image of a final hand in which the discarded cards have been replaced by three sixes. Thus, in this example two non-winning cards were replaced by winning cards.

Figure 11A:
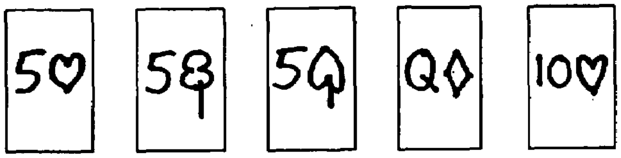
FIG. 11A is an illustration of an example image that may be displayed during performance of the routine of FIG. 5.
Figure 11B:
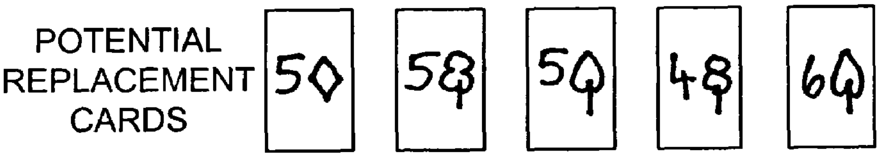
FIG. 11B is an illustration of potential replacement cards associated with the example image of FIG. 11A.
Figure 11C:
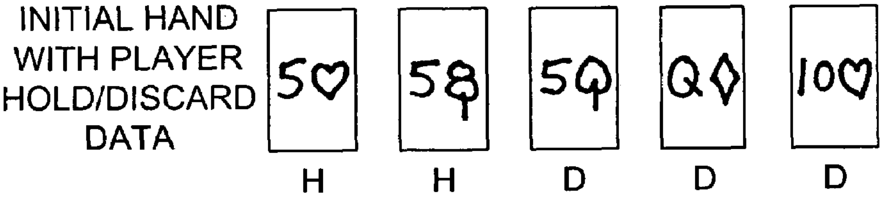
FIG. 11C is an illustration of player hold/discard data associated with the example image of FIG. 11A.
Figure 11D:
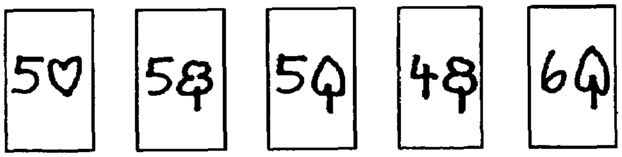
FIG. 11D is an illustration of another example image that may be displayed during performance of the routine of FIG. 5.

Referring again to FIG. 5, in still another embodiment, when the initial hand of cards is determined at the block 320, a potential replacement card for each card in the initial hand may be determined as well. Such potential replacement cards may be determined in a variety of ways. For example, the controller 200 (FIG. 4) may determine the potential replacement cards once the initial hand of cards has been determined. As another example, the gaming unit 20 may receive data associated with the game outcome data from, for instance, the central server 28, the local server 22, etc., that indicates the potential replacement cards associated with game outcome data, with a particular initial hand, etc. FIG. 11A is an image of an example initial hand of cards. Additionally, FIG. 11B illustrates an example of corresponding potential replacement cards for the cards of FIG. 11A. FIG. 11C illustrates hold/discard data received from the player for the initial hand of FIG. 11A. FIG. 11D illustrates a final hand in which the discarded cards have been replaced by corresponding replacement cards from the potential replacement cards of FIG. 11B.

Figure 12:
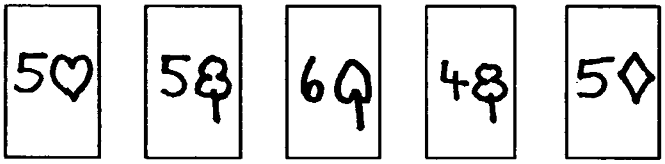
FIG. 12 is an illustration of still another example image that may be displayed during performance of the routine of FIG. 5.

In the above-described examples, the replacement winning cards were displayed in the final hand in the same position as the winning cards from the initial hand that they replaced. It is to be understood that replacement winning cards in the final hand may also be displayed in a position that corresponds to one of the non-winning cards of the initial hand. For example, FIG. 12 illustrates a final hand that is the same as the final hand of FIG. 6C, but where the replacement winning card is in a position that corresponds to one of the non-winning cards of the initial hand.

Also, the above-described examples relate to images of playing cards. In other examples, different images and/or different symbols can be used. For instance, images of playing card symbols or other symbols may be displayed via actual reels or video representations of reels of a reel-type slots game. Generally, any set of symbols may be used where different combinations of different symbols may be used to indicate various levels of awards. Thus, games need not relate to a poker game.

In the above description, various methods have been described with reference to flow diagrams. It will be apparent to one of ordinary skill in the art that each of these methods may be implemented, in whole or in part, by software, hardware, and/or firmware. If implemented, in whole or in part, by software, the software may be stored on a tangible medium such as a CD-ROM, a floppy disk, a hard drive, a digital versatile disk (DVD), a ROM, an erasable programmable ROM (EPROM), an electrically erasable programmable PROM (EEPROM), a flash memory, etc. Further, although the examples described above were described with reference to various flow diagrams, one of ordinary skill in the art will appreciate that many other methods may alternatively be used. For example, the order of execution of the blocks may be changed, additional blocks may be added, and/or some or all of the blocks may be changed, eliminated, or combined.

What is claimed is:

1. A method of operating a gaming device, for each and every play of a game said method comprising:

(a) receiving data indicative of a final outcome for a play of the game upon a wager;

(b) if the received data indicative of the final outcome indicates a winning outcome:

(i) displaying an initial set of symbols indicative of the final outcome, the initial set of symbols including an initial winning subset of symbols and an initial non-winning subset of symbols, said initial set of symbols selected from a plurality of identical sets of symbols, each set of symbols having a plurality of different symbols;

(ii) receiving player input data indicative of a subset of symbols in the initial set to be discarded; and (iii) if the received player input data indicative of the subset of symbols to be discarded includes at least one symbol from the initial winning subset:

(A) determining replacement symbols such that a final set of symbols is indicative of the final outcome, wherein the final set of symbols includes the replacement symbols in place of the subset of symbols to be discarded and said replacement symbols are from the plurality of identical sets of symbols;

(B) displaying the final set of symbols which is indicative of the final outcome; and (C) providing, according to a predetermined paytable, an award corresponding to the displayed final set of symbols, wherein, for the play of the game, the award is provided regardless of the player input data; and (c) repeating (a) to (b) for at least another play of the game, wherein for each and every play of the game, if a final outcome indicates a winning outcome, a final set of symbols which is indicative of the winning outcome is displayed to the player regardless of any player input.

2. The method of claim 1, wherein determining replacement symbols comprises determining a replacement of a symbol from the initial winning subset as the same symbol.

3. The method of claim 2, wherein determining the replacement of the symbol from the initial winning subset comprises determining the replacement of the symbol from the initial winning subset as the same symbol when the replacement of the symbol from the initial winning subset cannot be a different symbol such that the final set of symbols is indicative of the final outcome.

4. The method of claim 1, wherein determining replacement symbols comprises determining a replacement of a symbol from the initial winning subset as a different symbol.

5. The method of claim 1, wherein the subset of symbols to be discarded includes first and second symbols from the initial winning subset, wherein determining replacement symbols comprises:

determining a replacement of the first symbol from the initial winning subset as the same symbol; and determining a replacement of the second symbol from the initial winning subset as a different symbol.

6. The method of claim 1, wherein receiving the data indicative of the final outcome comprises receiving the data indicative of the final outcome via a communication link.

7. The method of claim 6, further comprising: sending a request for game outcome data via a communication link; and receiving the data indicative of the final outcome in response to the request.

8. The method of claim 1, wherein receiving the data indicative of the final outcome comprises receiving the data indicative of the final outcome from a memory of a gaming unit.

9. The method of claim 1, wherein displaying the initial set of symbols comprises displaying an image of a first hand of cards; and wherein displaying the final set of symbols comprises displaying an image of a second hand of cards.

10. A gaming apparatus comprising:

a display unit;

a value input device;

a player input device; and a controller operatively coupled to the display unit, the value input device, and the player input device, the controller comprising a processor and a memory operatively coupled to the processor, for each and every play of a game, the controller being programmed to:

(a) request data indicative of a final outcome for the play of the game upon a wager; and (b) if the data indicative of the final outcome indicates a winning outcome:

(i) cause the display unit to display an initial set of symbols indicative of the final outcome, said initial set of symbols selected from a plurality of identical sets of symbols, each set of symbols having a plurality of different symbols, the initial set of symbols including an initial winning subset of symbols and an initial non-winning subset of symbols, (ii)receive player input data from the player input device, the player input data indicative of a subset of symbols in the initial set to be discarded, (iii) determine replacement symbols, such that, if the subset of symbols to be discarded includes at least one symbol from the initial winning subset, a final set of symbols is indicative of the final outcome, wherein the final set of symbols includes the replacement symbols in place of the subset of symbols to be discarded and said replacement symbols are from the plurality of identical sets of symbols, (iv) regardless of the player input data, cause the display unit to display the final set of symbols which is indicative of the final outcome, and (v) provide, according to a predetermined paytable, an award corresponding to the displayed final set of symbols, wherein, for each and every play of the game, the award is provided regardless of the player input data.

11. The gaming apparatus of claim 10, wherein the controller is programmed to determine a replacement of a symbol from the initial winning subset as the same symbol.

12. The gaming apparatus of claim 11, wherein the controller is programmed to determining the replacement of the symbol from the initial winning subset as the same symbol when the replacement of the symbol from the initial winning subset cannot be a different symbol such that the final set of symbols is indicative of the final outcome.

13. The gaming apparatus of claim 10, wherein the controller is programmed to determine a replacement of a symbol from the initial winning subset as a different symbol.

14. The gaming apparatus of claim 10, wherein the subset of symbols to be discarded includes first and second symbols from the initial winning subset;

wherein the controller is programmed to determine a replacement of the first symbol from the initial winning subset as the same symbol; and wherein the controller is programmed to determine a replacement of the second symbol from the initial winning subset as a different symbol.

15. The gaming apparatus of claim 10, further comprising an input/output (I/O) device communicatively coupled to a server via a communication link, the I/O device operatively coupled to the controller;

wherein the controller is programmed to transmit to the server via the I/O device a request for data indicative of the final outcome.

16. The gaming apparatus of claim 15, wherein the controller is programmed to receive the data indicative of the final outcome from the server in response to the request sent to the server.

17. The gaming apparatus of claim 10, wherein the controller is programmed to request data indicative of a final outcome from the memory of the controller.

18. The gaming apparatus of claim 10, wherein the controller being programmed to cause the display unit to display the initial set of symbols comprises the controller being programmed to cause the display unit to display an image of a first hand of cards; and wherein the controller being programmed to cause the display unit to display the final set of symbols comprises the controller being programmed to cause the display unit to display an image of a second hand of cards.

19. A method of operating a gaming device, said method comprising:

(a) for a play of a game upon a wager, receiving data indicative of a final outcome via a communications link;

(b)if the received data indicative of the final outcome indicates a winning outcome:

(i) displaying a first hand of cards on a display unit of a gaming unit, the first hand of cards indicative of the final outcome, the first hand of cards including an initial winning subset of cards and an initial non-winning subset of cards, said first hand of cards selected from a plurality of sets of cards, wherein each card of a designated rank and a designated suit is included in each of the sets of cards;

(ii) receiving player input data indicative of a subset of cards in the initial hand to be discarded; and (iii) if the received player input data indicative of the subset of cards to be discarded includes at least one card from the initial winning subset:

(A) determining replacement cards such that a final hand of cards is indicative of the final outcome, wherein the final hand of cards includes the replacement symbols in place of the subset of symbols to be discarded and said replacement cards are from the plurality of sets of cards;

(B) displaying the final hand of cards which is indicative of the final outcome on the display unit of the gaming unit; and (C) providing, according to a predetermined paytable, an award corresponding to the displayed final hand of cards, wherein, for the play of the game, the award is provided regardless of the player input data;and (c) repeating (a) to (b) for at least another play of the game, wherein for each and every play of the game, if a final outcome indicates a winning outcome, a final hand of cards which is indicative of the winning outcome is displayed to the player regardless of any player input.

20. The method of claim 19, wherein determining replacement cards comprises determining a replacement of a card from the initial winning subset as the same card.

21. The method of claim 20, wherein determining the replacement of the card from the initial winning subset comprises determining the replacement of the card from the initial winning subset as the same card when the replacement of the card from the initial winning subset cannot be a different card such that the final set of cards is indicative of the final outcome.

22. The method of claim 19, wherein determining replacement cards comprises determining a replacement of a card from the initial winning subset as a different card.

23. The method of claim 19, wherein the subset of cards to be discarded includes first and second cards from the initial winning subset, wherein determining replacement cards comprises:

determining a replacement of the first card from the initial winning subset as the same card; and determining a replacement of the second card from the initial winning subset as a different card.

24. The method of claim 19, wherein each set of cards includes fifty-two cards.

25. A method for operating a gaming device, said method comprising:

(a) receiving data representing a predetermined game outcome for a play of a game upon a wager;

(b) displaying a first hand of cards to a player, wherein if the predetermined game outcome is a winning game outcome:

(i) said first hand of cards includes an initial winning set of cards and wherein said first hand of cards is selected from a plurality of decks of cards, each deck of cards including a plurality of different cards and each deck of cards including each card of each rank and each suit;

(ii) enabling the player to designate a subset of cards of the displayed first hand of cards to replace; and (iii) if the subset of displayed cards designated to replace includes at least one card from the initial winning set of cards:

(A) determining replacement cards such that a second hand of cards is indicative of the predetermined game outcome, wherein the second hand of cards includes the replacement cards in place of the subset of cards to be replaced, the replacement cards are from the plurality of decks of cards and if a first card of a rank and a suit is designated to be replaced, a second card of the same rank and the same suit corresponding to the rank and the suit of the first card is determined from another one of the decks of cards to be one of the replacement cards;

(B) displaying the second hand of cards which is indicative of the predetermined game outcome; and (C) providing any award associated with the predetermined game outcome to the player, wherein, for each play of the game, the award is provided regardless of the player input data; and (c) repeating (a) to (b) for at least another play of the game, wherein for each and every play of the game, if a predetermined game outcome is a winning game outcome, a second hand of cards which is indicative of the predetermined winning game outcome is displayed to the player regardless of any player input.

26. The method of claim 25, wherein if the predetermined game outcome is a winning game outcome, said first hand of cards includes an initial non-winning set of cards.

27. The method of claim 25, wherein each deck of cards includes fifty-two cards.

28. The method of claim 25, wherein each card in the first hand of cards is different.

29. A method for operating a gaming device, said method comprising:

(a) receiving data representing a predetermined game outcome for a play of a game upon a wager;

(b) displaying a first hand of cards to a player, wherein said first hand of cards is selected from a plurality of decks of cards, each deck of cards including a plurality of different cards and each deck of cards including each card of each rank and each suit;

(c) enabling the player to designate zero, one or a plurality of the displayed cards of the first hand of cards to replace;

(d) determining a replacement card for each of any cards designated to be replaced such that a second hand of cards is indicative of the predetermined game outcome, wherein the replacement cards are from the plurality of decks of cards and if at least a first card of one of the ranks and one of the suits is designated to be replaced and said first card is required to form the second hand of cards indicative of the predetermined game outcome, a second card of the same rank and the same suit corresponding to the rank and the suit of the first card is determined from one of the decks of cards to be one of the replacement cards;

(e) displaying the second hand of cards which is indicative of the predetermined game outcome;

(f) providing any award associated with the predetermined game outcome to the player, wherein, for each play of the game, any award is provided regardless of the player input data; and (g) repeating (a) to (f) for at least another play of the game, wherein for each and every play of the game, a second hand of cards which is indicative of a predetermined game outcome is displayed to the player regardless of any player input.

30. The method of claim 29, wherein each deck of cards includes fifty-two cards.

31. The method of claim 29, wherein each card in the first hand of cards is different.

32. A method for operating a gaming device, said method comprising:

(a) receiving data representing a predetermined game outcome for a play of a game upon a wager;

(b) determining a plurality of cards to form a first hand of cards based on the predetermined game outcome, wherein said cards of said first hand of cards are selected from a plurality of decks of cards, each deck of cards including a plurality of different cards and each deck of cards including each card of each rank and each suit, wherein if at least a first card of one of the ranks and one of the suits is required to form a second hand of cards indicative of the predetermined game outcome, each of the other cards in the first hand of cards are different than the first card;

(c) displaying the first hand of cards to a player;

(d) enabling the player to designate zero, one or a plurality of the displayed cards of the first hand of cards to replace;

(e) determining a replacement card for each of any cards designated to be replaced such that the second hand of cards is indicative of the predetermined game outcome, wherein the replacement cards are from the plurality of decks of cards;

(f) displaying the second hand of cards which is indicative of the predetermined game outcome;

(g) providing any award associated with the predetermined game outcome to the player, wherein, for each play of the game, any award is provided regardless of the player input data; and (h) repeating (a) to (g) for another play of the game, wherein for each and every play of the game, a second hand of cards which is indicative of a predetermined game outcome is displayed to the player regardless of any player input.

33. The method of claim 32, wherein each deck of cards includes fifty-two cards.

34. The method of claim 32, wherein if a plurality of said cards of the first hand of cards are required to form a second hand of cards indicative of the predetermined game outcome, each of the other cards in the first hand of cards are different than said plurality of cards.

* * * * *